3,264,914
METHOD OF MAKING CASTELLATED BEAMS
Carl L. Lodjic, Long Beach, Calif., assignor to Stanray Corporation, Chicago, Ill., a corporation of Delaware
Original application Dec. 30, 1963, Ser. No. 334,384. Divided and this application Aug. 3, 1965, Ser. No. 476,913
6 Claims. (Cl. 83—25)

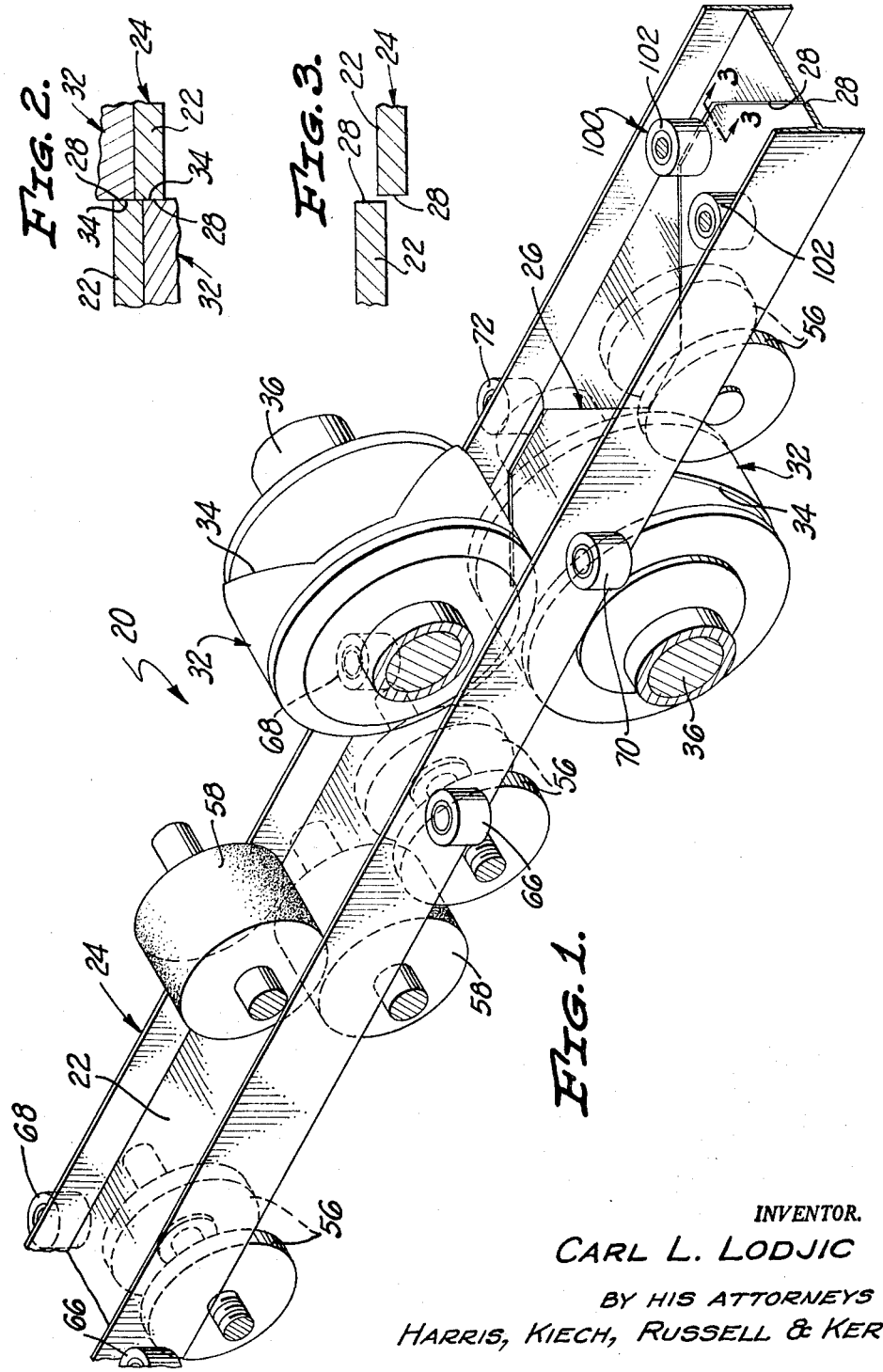

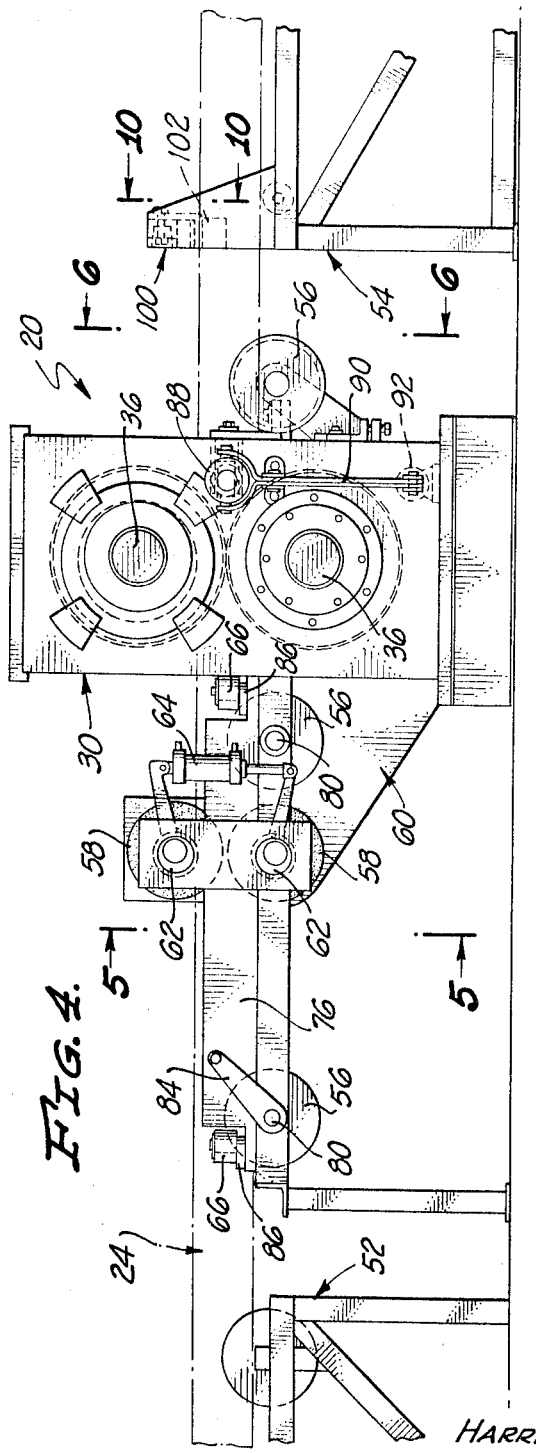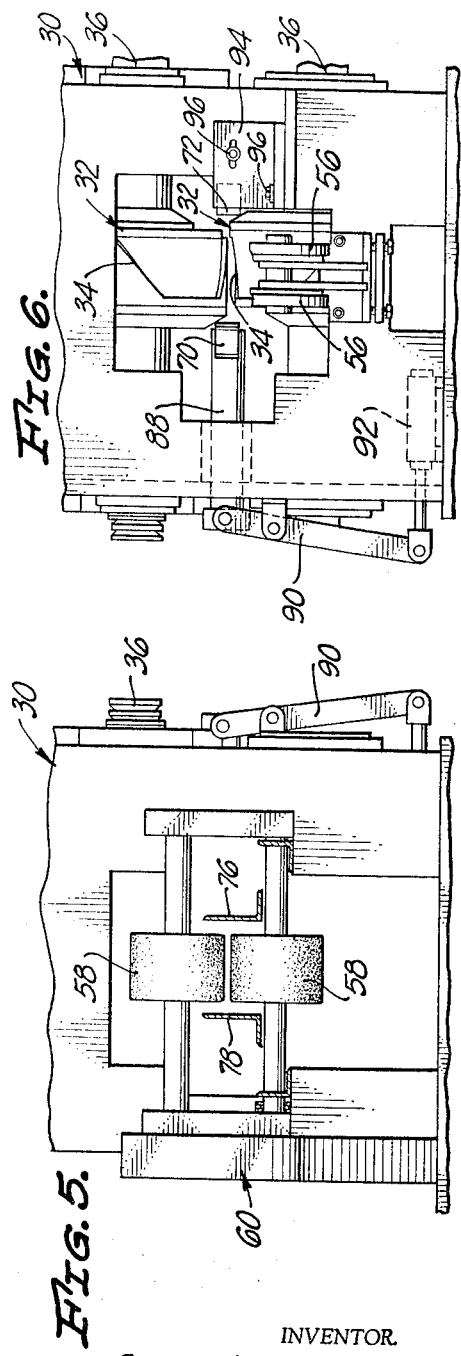

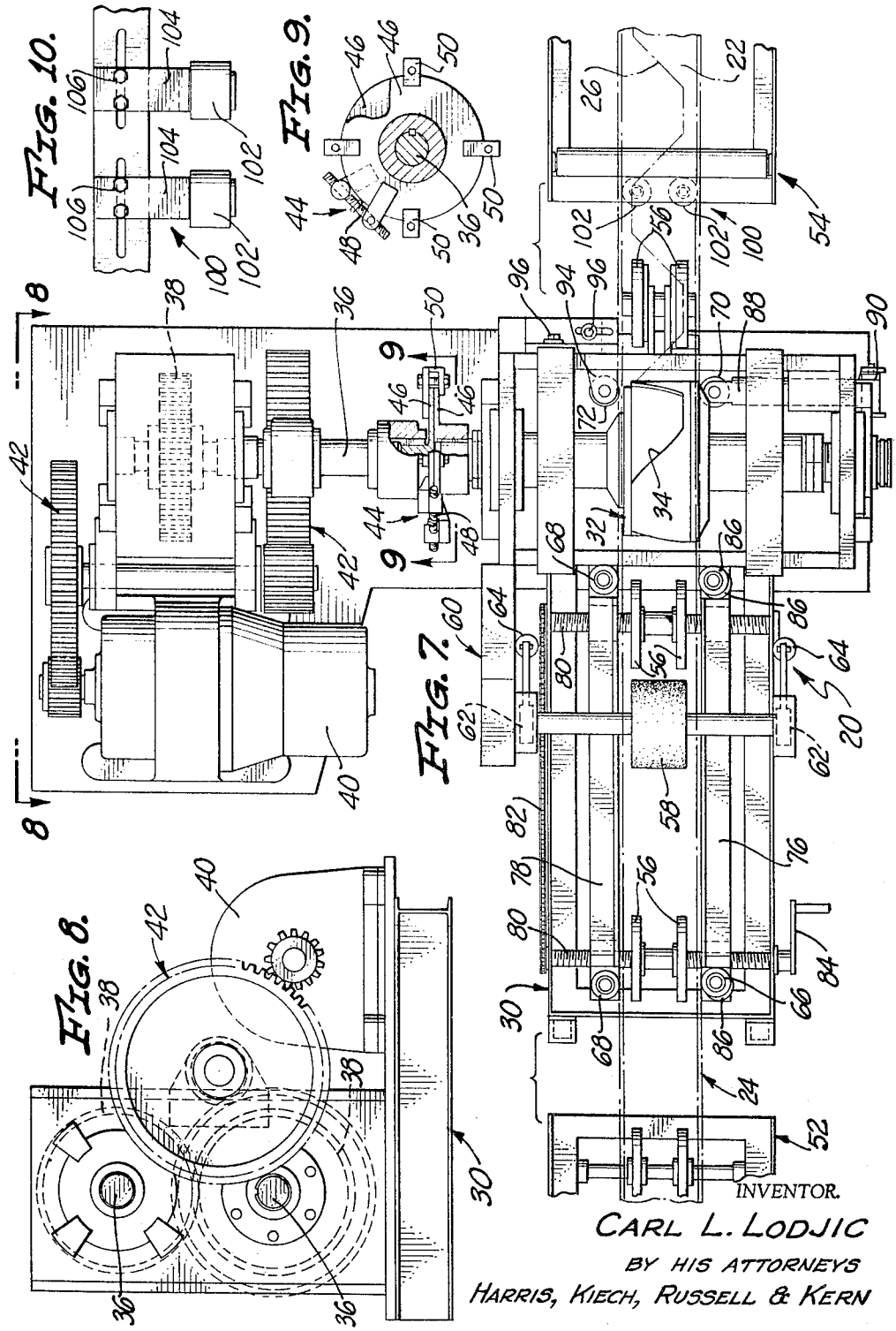

This application is a division of my co-pending application Serial No. 334,384, filed December 30, 1963.

The present invention relates in general to a method of making castellated beams and, more particularly, to a method of longitudinally dividing a web of a beam into two parts having complementary, cyclically-nonlinear longitudinal edges adapted to be welded together in out-of-phase relation to form a castellated beam.

More specifically, the invention contemplates shearing the web of the beam, in a direction perpendicular to the plane of the web, along a longitudinal line having a cyclic lateral variation in the plane of the web corresponding to the cyclically-nonlinear longitudinal edges desired for the two parts of the web. This may be accomplished, for example, by passing the web of the beam between two parallel shearing rolls having complementary, registering, circumferentially-extending shearing edges each of which comprises at least one whole cycle of the desired cyclic lateral variation.

A primary object of the invention is to relatively displace the two parts of the web, in a direction perpendicular to the plane of the web, a distance less than the thickness of the web while shearing it into two parts. This effect may be achieved by making the radius of each of the shearing edges less than one-half the distance between the axes of the shearing rolls so that the shearing edges are spaced apart at their closest approach to each other, i.e., so that the shearing edges do not bypass.

Limiting lateral displacement of the two parts of the web to a distance less than the thickness of the web in a direction perpendicular to its plane, has the important effect of causing the cyclically-nonlinear longitudinal edges of the two parts of the web to tend to remain fritionally interengaged to prevent splaying of the two parts of the beam as the web thereof is sheared. This insures that when the frictional interlock between the two parts of the sheared web is subsequently broken, the two parts of the beam will be straight and true so that the cyclically-nonlinear longitudinal edges of the web can be welded together, in out-of-phase relation, to form a castellated beam.

Another object of the invention is to laterally separate the two parts of the web, in a direction parallel to the plane of the web, after any splaying tendency induced by the shearing of the web into two parts has been dissipated.

Another object is to restrain the parts of the web against lateral separation in a direction parallel to the plane of the web until after any splaying tendency arising from the shearing action has been dissipated.

The foregoing objects, advantages, features and results of the present invention, together with various other objects, advantages, features and results thereof which will be evident to those skilled in the art to which the invention relates in the light of this disclosure, may be achieved with the exemplary embodiment of the invention described in detail hereinafter and illustrated in the accompanying drawings, wherein:

FIG. 1 is a semidiagrammatic perspective view of an apparatus, capable of carrying out the method of the invention, for shearing the web of a beam along a longitudinal line having a cyclic lateral variation in the plane of the web to provide the two parts of the web with complementary, cyclically-nonlinear longitudinal edges;

FIG. 2 is an enlarged, fragmentary sectional view through the shearing rolls of the apparatus and through the web of the beam at the point of shearing;

FIG. 3 is an enlarged, fragmentary sectional view through the web of the beam which is taken at the point indicated by the arrowed line 3—3 of FIG. 1;

FIG. 4 is a side elevational view of the shearing apparatus;

FIG. 5 is a transverse sectional view taken along the arrowed line 5—5 of FIG. 4;

FIG. 6 is an end view taken as indicated by the arrowed line 6—6 of FIG. 4;

FIG. 7 is a plan view of the shearing apparatus;

FIG. 8 is a side elevational view of a portion of the shearing apparatus and is taken as indicated by the arrowed line 8—8 of FIG. 7;

FIG. 9 is a sectional view taken along the arrowed line 9—9 of FIG. 7; and

FIG. 10 is a view taken as indicated by the arrowed line 10—10 of FIG. 4.

Referring to the drawings, and particularly FIG. 1 thereof, a shearing apparatus for performing the method of the invention is designated generally by the numeral 20 and is shown in use to shear the web 22 of a beam 24, which may be an I-beam, for example, into two parts along a cyclically-nonlinear longitudinal line 26 to provide the two parts of the web with correspondingly-cyclically-nonlinear, complementary longitudinal edges 28. After the web 22 of the beam 24 has been divided longitudinally into two parts, the two parts of the beam may be welded together, with the cyclically-nonlinear longitudinal edges 28 180° out of phase, to produce a castellated beam, not shown. Preferably, the two cyclically-nonlinear longitudinal edges 28 respectively comprise two longitudinal series of complementary trapezoids having straight sides and flat tops.

In accordance with the invention, the web 22 of the beam 24 is sheared along the cyclically-nonlinear longitudinal line 26, in a lateral direction perpendicular to the plane of the web, without displacing the cyclically-nonlinear longitudinal edges 28 of the web out of frictional interengagement, as shown in FIG. 2 of the drawings. In other words, in the shearing process, the two parts of the web are displaced in a direction perpendicular to the plane of the web a distance less than the thickness of the web, as shown in FIG. 2, so that the cyclically-nonlinear longitudinal edges 28 tend to remain interfitted in frictional interengagement so as to frictionally lock the two parts of the web together. To achieve this result, the relative displacement of the cyclically-nonlinear edges 28 in a direction perpendicular to the plane of the web 22 should not exceed about 90% of the thickness of the web, but should be at least about 70% of the web thickness to insure complete shearing.

The foregoing frictional interlock between the cyclically-nonlinear longitudinal edges 28 is an important feature of the invention since it insures that the two parts of the beam 24 will not tend to splay as the result of the shearing operation. If the relative displacement of the two longitudinal edges 28 in a direction perpendicular to the plane of the web 22 were to exceed the thickness of the web as the result of the shearing operation, the two parts of the beam 24 would tend to splay and could not be welded together to form a castellated beam without straightening them. The present invention insures that the two parts of the beam 24 will be straight and true so that they can be welded together to form a castellated beam without any straightening operations.

To insure that the frictional interlock between the longitudinal edges 28 will be adequate to prevent splaying of the two parts of the beam 24, the sides of the trapezoidal portions of the two parts of the web 22 should make an angle of at least about 30° with the longitudinal axis of the beam. However, this angle should not exceed about 60° to facilitate lateral separation of the two parts of the beam 24, in a direction parallel to the plane of the web 22, after any splaying tendency produced by the shearing process has dissipated, as will be discussed hereinafter.

Considering the shearing apparatus 20 in more detail, it includes a frame 30, FIGS. 4 to 8, carrying parallel shearing rolls 32 provided on their peripheral surfaces with complementary, registering, circumferentially-extending shearing edges 34 each comprising at least one whole cycle of the cyclic lateral variation corresponding to the desired cyclically-nonlinear longitudinal line 26. As will be clear from FIG. 1 of the drawings, the web 22 of the beam 24 is passed longitudinally between the shearing rolls 32 with the result that the shearing edges 34 shear the web along the cyclically-nonlinear longitudinal line 26 to produce the cyclically-nonlinear longitudinal edges 28.

To insure that the longitudinal edges 28 of the two parts of the web 22 will not be displaced out of frictional interengagement, in a direction perpendicular to the plane of the web, by the shearing edges 34, the radius of each shearing edge is less than one-half the distance between the axes of the shearing rolls so that the shearing edges are spaced apart at their closest approach to each other, i.e., so that the shearing edges do not bypass, this being best shown in FIG. 2 of the drawings. To achieve complete shearing while maintaining the desired frictional interlock, the clearance between the shearing edges 34 should be between about 70% and about 90% of the thickness of the web 22.

Turning particularly to FIGS. 7 to 9 of the drawings, the shearing rolls 32 are carried by parallel shafts 36 suitably rotatably mounted on the frame 30. These shafts carry gears 38 which are meshed together, as best shown in FIG. 8, to insure that the shearing rolls 32 are driven in absolute synchronism to maintain the shearing edges 34 in phase. The two shafts 36 are driven by an electric motor 40 which is connected to one of the shafts by a suitable gear train 42.

To obtain the correct phasing of the shearing edges 34 initially, an angular adjustment means 44, FIGS. 7 and 9, is incorporated in one of the shafts 36. More particularly, this shaft is split into two parts respectively having coupling members 46 thereon. These coupling members are interconnected by a tangentially-extending adjusting screw 48 having portions of opposite hand in engagement with the respective coupling members. As will be apparent, by rotating the adjusting screw 48 in one direction or the other, the corresponding shearing roll 32 may be angularly displaced in one direction or the other to bring its shearing edge 34 precisely into phase with the shearing edge of the other shearing roll. Once this adjustment has been made, the two coupling members 46 may be suitably locked together to maintain it, as by clamping means 50.

As shown in FIGS. 4 and 7 of the drawings, the beam 24 is delivered to the shearing apparatus 20 by a delivery conveyor 52 of any suitable construction. After shearing, the beam 24 passes onto a discharge conveyor 54 of any suitable construction.

Considering the manner in which the beam 24 is guided and fed through the shearing apparatus 20, it is shown as supported therein by pairs of supporting rolls 56 on which the web 22 rests. Driving rolls 58 frictionally engage opposite sides of the web 22 to propel it between the shearing rolls 32 so that the latter are not required to feed the beam 24 through the shearing apparatus 20. The driving or feeding rolls 58 are driven in synchronism with the shearing rolls 32 in any suitable manner, as by a driving connection therebetween which is illustrated generally by the numeral 60 in FIGS. 4 and 7 of the drawings. Thus, in effect, the shearing rolls 32 merely idle with respect to the web 22 of the beam 24 in the longitudinal direction, there being no longitudinal load on the shearing rolls. This avoids imposing longitudinal stresses on the shearing edges 34, which is an important feature.

As shown in FIGS. 4 and 7 of the drawings, the ends of shafts carrying the driving or feeding rolls 58 are mounted on eccentrics 62 adapted to be angularly displaced in opposite directions in unison by fluid motors 64, which may be air cylinders. As will be apparent, the air cylinders 64 may be actuated to angularly displace the eccentrics 62 in opposite directions to cause lateral separation of the driving or feeding rolls 58 to permit initial insertion of the web 22 of the beam 24 therebetween. The air cylinders 64, which are preferably double acting, are subsequently actuated in the opposite direction to positively clamp the web 22 between the two driving or feeding rolls 58. This insures positive frictional engagement of the driving rolls 58 with the opposite sides of the beam web 22.

The beam 24 is guided through the shearing apparatus 20, with reference to a lateral direction parallel to the plane of the web 22, by a guide means which includes guide rollers 66 and guide rollers 68 engageable with the exterior surfaces of the respective flanges of the beam upstream from the shearing rolls 32. This guide means also includes guide rollers 70 and 72 engagable with the exterior surfaces of the respective beam flanges immediately downstream from the point of shearing of the web 22 of the beam 24 by the shearing rolls 32. It will be noted that the guide rolls 70 and 72 serve to assist the frictional interlock between the longitudinal edges 28 of the two beam halves in preventing premature lateral separation of the two beam halves in the direction of the plane of the web.

Considering the foregoing guide means in more detail, the guide rollers 66 and 68 are respectively mounted on carriages 76 and 78 which are laterally movable toward and away from each other in the direction of the plane of the web 22 of the beam 24, the purpose of this being to accommodate beams of different depths. More particularly, the carriages 76 and 78 are threadedly engaged by opposite handed portions of longitudinally spaced, transverse screws 80. These screws are interconnected for rotation in synchronism in any suitable manner, as by a chain 82, and one of them is provided with a handle 84. As will be apparent, by rotating the handle 84 to drive the screws 80, the lateral distance between the guide rollers 66 and the guide rollers 68 may be varied to accommodate a beam of any depth within a predetermined depth range.

The guide rollers 66 are mounted on eccentrics 86 which may be angularly displaced in unison in any suitable manner, not shown, to move the guide rollers 66 into and out of engagement with the outer surface of the corresponding beam flange. Initially, the eccentrics 86 are rotated to displace the guide rollers 66 out of the line of movement of the outer surface of the corresponding beam flange to permit insertion of the beam 24 between the guide rollers 66 and the guide rollers 68. Subsequently, and before the driving or feeding rolls 58 and the shearing rolls 32 are energized, the eccentrics 86 are rotated to displace the guide rollers 66 firmly into engagement with the outer surface of the corresponding beam flange.

As best shown in FIGS. 6 and 7, the downstream guide rollers 70 and 72 are also laterally adjustable to accommodate different beam depths. The guide roller 70 is mounted on a carriage 88 which is laterally movable relative to the frame 30 in the direction of the plane of the web 22 of the beam 24, such carriage being connected, through a suitable linkage 90, to a double-acting air cylinder 92, or other actuating device. As will be apparent, the air cylinder 92 may be actuated to withdraw the guide roller 70 out of the line of movement of the outer surface of the corresponding beam flange. After the leading end of the beam 24 has entered the space between the guide rollers 70 and 72, the air cylinder 92 may be actuated in the opposite direction to bring the guide roller 70 into positive engagement with the outer surface of the corresponding beam flange to cause it to cooperate with the guide roller 72 to assist the frictional interlock between the longitudinal edges 28 of the two halves of the beam 24 in preventing splaying of the two halves of the beam. It will be noted that this actuating means for the guide roller 70 permits it to accommodate beams of different depths.

The guide roller 72 which is paired with the guide roller 70 is also laterally adjustable in the direction of the plane of the beam web 22 to accommodate beams of different depths. In this case, however, a fixed type of adjustment may be used, the guide roller 72 being mounted on a carriage 94 which is movable laterally relative to the frame 30 in the direction of the plane of the beam web and which may be locked in the desired position by clamping bolts 96.

The method of the invention also provides for laterally separating the two parts of the beam 24 in the direction of the plane of the web 22, such lateral separation involving breaking the frictional interlock between the two interfitted longitudinal edges 28. A separating means 100, which in this instance is shown as mounted on the discharge conveyor 54, is located a sufficient distance downstream from the shearing rolls 32 to insure that frictional interengagement between the interfitted longitudinal edges 28 will be maintained immediately downstream from the shearing rolls. As previously discussed, this is important to prevent any tendency of the beam 24 to splay as it is sheared into two parts. To achieve this result, the separating means 100 must be located at least about 20 feet downstream from the shearing rolls 32.

The separating means 100 is shown as comprising two separating or breaking rolls 102 engageable with the inner surfaces of the respective beam flanges on one side of the web 22. The breaking rolls 102 are mounted on carriages 104 which are laterally adjustable, in a plane parallel to the plane of the web 22, to accommodate beams of different depths. As best shown in FIG. 10, the carriages 104 may be clamped in the correct positions by means of clamping bolts 106.

As will be apparent from the foregoing, the present invention provides a simple and effective method of shearing the web of a beam into two complementary parts, along a longitudinal line having a cyclic lateral variation in the plane of the web, without producing any significant distortion of either of the two parts. Consequently, by relatively moving the two parts longitudinally until the cyclically-nonlinear longitudinal edges thereof are 180° out of phase, they may be welded together to produce a castellated beam without any necessity for straightening or truing the two parts, which is an important feature.

Although an exemplary embodiment of the invention has been disclosed herein for purposes of illustration, it will be understood that various changes, modifications and substitutions may be incorporated in such embodiment without departing from the spirit of the invention as defined by the claims which follow.

I claim:

1. A method of dividing a member into two interfitted parts, including the step of:
   (a) shearing said member into two parts in a direction perpendicular to a surface of said member and along a nonlinear line, while simultaneously relatively displacing said parts of said member in said direction a distance less than the thickness of said member, so as to provide said parts of said member with interfitted nonlinear edges coinciding with said nonlinear line and tending to remain frictionally interengaged to frictionally lock said parts of said member together.

2. A method of dividing a member into two parts having complementary nonlinear edges, including the steps of:
   (a) shearing said member in a direction perpendicular to a surface of said member, and along a nonlinear line corresponding to said nonlinear edges, while simultaneously relatively displacing said parts of said member in said direction a distance less than the thickness of said member, whereby said nonlinear edges tend to remain frictionally interengaged to frictionally lock said parts of said member together; and
   (b) subsequently separating said parts of said member.

3. A method of longitudinally dividing a web of a beam into two parts having complementary, cyclically-nonlinear longitudinal edges, including the steps of:
   (a) shearing said web in a first lateral direction perpendicular to the plane of said web, and along a cyclically-nonlinear longitudinal line corresponding to said cyclically-nonlinear longitudinal edges, while simultaneously relatively displacing said parts of said web in said first lateral direction a distance less than the thickness of said web, whereby said cyclically-nonlinear longitudinal edges tend to remain frictionally interengaged to frictionally lock said parts of said web together; and
   (b) sequently laterally separating said parts of said web in a second lateral direction perpendicular to said first lateral direction and parallel to said plane of said web.

4. A method of longitudinally dividing a web of a beam into two parts having complementary, cyclically-nonlinear longitudinal edges, including the steps of:
   (a) shearing said web in a first lateral direction perpendicular to the plane of said web, and along a cyclically-nonlinear longitudinal line corresponding to said cyclically-nonlinear longitudinal edges, while simultaneously relatively displacing said parts of said web in said first lateral direction;
   (b) simultaneously restraining said parts of said web against lateral separation in a second lateral direction perpendicular to said first lateral direction and parallel to said plane of said web; and
   (c) subsequently laterally separating said parts of said web in said second lateral direction.

5. A method of longitudinally dividing a web of a beam into two parts having complementary, cyclically-nonlinear longitudinal edges, including the steps of:
   (a) shearing said web in a first lateral direction perpendicular to the plane of said web, and along a cyclically-nonlinear longitudinal line corresponding to said cyclically-nonlinear longitudinal edges, while simultaneously relatively displacing said parts of said web in said first lateral direction a distance less than the thickness of said web, whereby said cyclically-nonlinear longitudinal edges tend to remain frictionally interengaged to frictionally lock said parts of said web together;
   (b) simultaneously restraining said parts of said web against lateral separation in a second lateral direction perpendicular to said first lateral direction and parallel to said plane of said web; and
   (c) subsequently laterally separating said parts of said web in said second lateral direction.

6. A method of longitudinally dividing a web of a beam into two parts having complementary, cyclically-nonlinear longitudinal edges, including the steps of:
  (a) shearing said web in a first lateral direction perpendicular to the plane of said web, and along a cyclically-nonlinear longitudinal line corresponding to said cyclically-nonlinear longitudinal edges, while simultaneously relatively displacing said parts of said web in said first lateral direction a distance at least about 70%, but not more than about 90%, of the thickness of said web, whereby said cyclically-nonlinear longitudinal edges tend to remain frictionally interengaged to frictionally lock said parts of said web together;
  (b) simultaneously restraining said parts of said web against lateral separation in a second lateral direction perpendicular to said first lateral direction and parallel to said plane of said web; and
  (c) subsequently laterally separating said parts of said web in said second lateral direction.

No references cited.

ANDREW R. JUHASZ, *Primary Examiner.*

LEIGH TAYLOR, *Examiner.*